United States Patent
Ranta-Aho et al.

(10) Patent No.: US 10,142,875 B2
(45) Date of Patent: Nov. 27, 2018

(54) COMPRESSED MODE FOR UMTS ENHANCED DEDICATED CHANNEL FOR CIRCUIT SWITCHED VOICE SERVICES

(71) Applicant: Nokia Solutions and Networks Oy, Espoo (FI)

(72) Inventors: Karri Markus Ranta-Aho, Esoii (FI); Hans Thomas Hoehne, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 55 days.

(21) Appl. No.: 15/128,068

(22) PCT Filed: Mar. 21, 2014

(86) PCT No.: PCT/EP2014/055729
§ 371 (c)(1),
(2) Date: Sep. 21, 2016

(87) PCT Pub. No.: WO2015/139774
PCT Pub. Date: Sep. 24, 2015

(65) Prior Publication Data
US 2017/0105135 A1    Apr. 13, 2017

(51) Int. Cl.
*H04W 4/00*  (2018.01)
*H04W 24/10* (2009.01)
(Continued)

(52) U.S. Cl.
CPC ............ *H04W 24/10* (2013.01); *H04L 69/04* (2013.01); *H04W 72/0406* (2013.01)

(58) Field of Classification Search
CPC combination set(s) only.
See application file for complete search history.

(56) References Cited

U.S. PATENT DOCUMENTS

| | | | |
|---|---|---|---|
| 2015/0215869 A1* | 7/2015 | Tsai | H04W 52/0209 370/311 |
| 2015/0271816 A1* | 9/2015 | Akkarakaran | H04W 72/0446 370/336 |
| 2015/0271869 A1* | 9/2015 | Akkarakaran | H04W 52/0216 370/329 |

OTHER PUBLICATIONS

3GPP TR 25.702, 3rd Generation Partnership Project; Technical Specification Group Radio Access Network; DCH Enhancements for UMTS, V1.0.0, 2013.*

(Continued)

*Primary Examiner* — Frank Duong
(74) *Attorney, Agent, or Firm* — Squire Patton Boggs (US) LLP

(57) ABSTRACT

The present invention addresses methods, apparatuses and computer program products for improved compressed mode operation for enhanced dedicated channel DCH in circuit switched CS voice services/transmissions. A compressed mode of a user equipment is configured during performing a circuit switched voice service over a dedicated channel according to Wideband Code-Division Multiple Access operation upon demand for network specific measurement, whereby measurement gaps are created in the data transmission. In uplink, transmission of a voice frame to be compressed is performed using a 10 ms transmission, whereas in downlink, transmission of a voice frame to be compressed is stopped after a fixed number of slots have been transmitted, wherein the fixed number of slots is set such as to ensure a measurement gap with at least 14 slots.

19 Claims, 12 Drawing Sheets

(51) Int. Cl.
*H04L 29/06* (2006.01)
*H04W 72/04* (2009.01)

(56) References Cited

OTHER PUBLICATIONS

International Search Report and Written Opinion received for corresponding Patent Cooperation Treaty Application No. PCT/EP2014/055729, dated Jan. 5, 2015, 12 pages.
Mediatek Inc., "Uplink compressed mode considerations", 3GPP TSG RAN WG1 Meeting #76, R1-140253, Prague, Czech Republic, Feb. 10-14, 2014, 4 pages.
Mitsubishi Electric, "Uplink Compressed Mode Frame Format", TSG-RAN WG1#7bis, TSGR1#7(99)e90, 4./5.10.99 Kyongju/Korea, 5 pages.
Nokia Solutions and Networks Oy (NSN), "Compressed mode for enhanced DCH", 3GPP TSG-RAN WG1 Meeting #76bis, R1-141657, Shenzhen, P.R. China, Mar. 31-Apr. 4, 2014, 7 pages.
MediaTek Inc., "Uplink compressed mode design for DCH enhancements", 3GPP TSG RAN WG1 Meeting #76, R1-141493, Shenzhen, China, Mar. 31-Apr. 4, 2014, 7 pages.

* cited by examiner

COMPRESSED MODE FOR UMTS ENHANCED DEDICATED CHANNEL FOR CIRCUIT SWITCHED VOICE SERVICES

RELATED APPLICATION

This application was originally filed as Patent Cooperation Treaty Application No. PCT/EP2014/055729 filed Mar. 21, 2014.

FIELD OF THE INVENTION

The present invention generally relates to wired and wireless communication networks, and more specifically relates to methods, apparatuses and computer program products for improved compressed mode operation for enhanced dedicated channel DCH in circuit switched CS voice services/transmissions.

BACKGROUND

Mobile data transmission and data services are constantly making progress, wherein such services provide various communication services, such as voice, video, packet data, messaging, broadcast, etc. In recent years, Long Term Evolution LTE™ has been specified, which uses the Evolved Universal Terrestrial Radio Access Network E-UTRAN as radio communication architecture according to 3GPP specification.

Further, 3GPP has been working on improving the dedicated channel DCH for more efficient circuit switched CS voice support, targeting Release 12 of the 'Wideband Code-Division Multiple Access' WCDMA and 'Universal Mobile Telecommunications System' UMTS specifications.

According to the respective specification of the year 1999, i.e. from the very introduction of WCDMA DCH, a continuous transmission is used, where 20 ms-long voice frames are transmitted over 20 ms Transmission Time Interval TTI over the air. Each active user has a dedicated code channel, and multiple users transmit and receive the voice frames in parallel.

WCDMA, ever since the release of the year 1999, features a compressed mode CM, which is used to generate transmission and reception gaps enabling the user equipment UE to perform inter-frequency and inter-radio access technology RAT measurements for mobility purposes. For employing the enhanced DCH, it needs to be able to provide measurement gaps as well. However, the typical CM gap pattern is not compatible with the uplink control channel structure selected for the enhanced DCH channel for voice, as it needs 10 slots to transmit the Transport Format Combination Indication TFCI information, but only 8 are available with the existing compressed mode with the gap pattern typically characteristic for conversational services such as voice.

In particular, as indicated above, the compressed mode CM according to 3GPP-release of 1999 specifications is designed to provide gaps in transmission that allow for the UE to retune its receiver on another frequency for a short time duration in order for it to perform measurements on that frequency. A typical CM parameterization for CS voice link is a 14-slot gap that spans over two radio frames and repeats once every 40 ms. Such structure is deemed sufficient for fast detection of inter-frequency neighbor WCDMA cells, or other radio systems, such as GSM or LTE, on another frequency.

The loss of slots due to the CM gap is compensated for by increasing the data rate and transmission power of the remaining slots in the radio frame experiencing the CM gap, so that the full voice frame is still transmitted over the air. Also the control channel slot formats are changed so that there are enough available control channel bits to transmit all needed information in the reduced number of slots being transmitted.

FIG. 1a schematically shows the transmission of a voice frame on WCDMA in the case of a normal (i.e. uncompressed transmission) according to the prior art. A radio frame of 10 ms comprises 15 slots, and a CS voice frame TTI is 20 ms. Further, FIG. 1b schematically shows transmission of a voice frame on WCDMA in the case of a compressed mode transmission according to the prior art. Thereby, a CM gap is provided, which typically comprises 14 slots. The CM gap starting at slot #9 (slots 1 . . . 8 transmitted, 9 . . . 15 not) is not compatible with the selected uplink control channel structure for enhanced DCH, where the first 10 slots are needed to deliver the TFCI information. Further the compressed mode structure according to the prior art is not very efficient compared to what can be achieved when the enhanced DCH properties were exploited.

Still further, FIG. 2 illustrates a proposal for CM with enhanced DCH according to 3GPP 'R1-140253'. A 4-slot gap is generated in the middle, and after the downlink frame early termination acknowledgement bit (FET-ACK) is sent in the UL the remaining non-transmitted slots complement the gap. FIG. 2 also shows the uplink Dedicated Physical Control Channel DPCCH construction. The first 10 slots carry pilots (6 bits per slot), Transport Format Combination Indication TFCI (2 bits) and Transmit Power Control Command TPC (2 bits). The full TFCI information is encoded to these 10 slots, informing the Node B the transport format used on the DPDCH. The remaining slots substitute the TFCI with FET-ACK, first indicating NACK in each slot, until the DL voice frame successfully decodes, after which the UE starts to transmit ACK. However, this solution is cumbersome due to splitting the gap in two, and the guaranteed contiguous gap duration is very short (gap of 2.6 ms) and does not guarantee e.g. LTE measurements, where the Synchronization Channel SCH essential for detecting there is a cell repeats every 5 ms.

SUMMARY OF THE INVENTION

Therefore, in order to overcome the drawbacks of the prior art, the present invention provides an improved compressed mode operation for enhanced dedicated channel DCH in circuit switched CS voice services/transmissions.

In particular, the present invention provides methods, apparatuses and computer program products for improved compressed mode operation for enhanced dedicated channel DCH in circuit switched CS voice services/transmissions.

According to a first aspect of the present invention, there is provided a method, comprising configuring a compressed mode during performing a circuit switched voice service over a dedicated channel according to Wideband Code-Division Multiple Access operation in case a demand for network specific measurement is determined, creating measurement gaps in the data transmission, in uplink, causing transmission of a voice frame to be compressed using a 10 ms transmission, and in downlink, transmission of a voice frame to be compressed is stopped after a fixed number of slots have been transmitted, wherein the fixed number of slots is set such as to ensure a measurement gap with at least 14 slots.

According to a second aspect of the present invention, there is provided an apparatus, comprising at least one processor, and at least one memory including computer program code, wherein the at least one memory and the computer program code configured to, with the at least one processor, cause the apparatus at least to perform configuring a compressed mode during performing a circuit switched voice service over a dedicated channel according to Wideband Code-Division Multiple Access operation in case a demand for network specific measurement is determined, creating measurement gaps in the data transmission, in uplink, causing transmission of a voice frame to be compressed using a 10 ms transmission, and in downlink, transmission of a voice frame to be compressed is stopped after a fixed number of slots have been transmitted, wherein the fixed number of slots is set such as to ensure a measurement gap with at least 14 slots.

According to a third aspect of the present invention, there is provided a method, comprising determining configuration of a compressed mode of a user equipment during performing a circuit switched voice service over a dedicated channel according to Wideband Code-Division Multiple Access operation upon demand for network specific measurement, whereby measurement gaps are created in the data transmission, in uplink, receiving a voice frame to be compressed using a 10 ms transmission, and in downlink, causing transmission of a voice frame to be compressed, wherein transmission is stopped after a fixed number of slots have been transmitted, wherein the fixed number of slots is set such as to ensure a measurement gap with at least 14 slots.

According to a fourth aspect of the present invention, there is provided an apparatus, comprising at least one processor, and at least one memory including computer program code, wherein the at least one memory and the computer program code configured to, with the at least one processor, cause the apparatus at least to perform determining configuration of a compressed mode of a user equipment during performing a circuit switched voice service over a dedicated channel according to Wideband Code-Division Multiple Access operation upon demand for network specific measurement, whereby measurement gaps are created in the data transmission, in uplink, receiving a voice frame to be compressed using a 10 ms transmission, and in downlink, causing transmission of a voice frame to be compressed, wherein transmission is stopped after a fixed number of slots have been transmitted, wherein the fixed number of slots is set such as to ensure a measurement gap with at least 14 slots.

According to a fifth aspect of the present invention, there is provided a computer program product comprising computer-executable components which, when the program is run, are configured to carry out the method according to the first aspect or according to the third aspect.

Advantageous further developments or modifications of the aforementioned exemplary aspects of the present invention are set out in the dependent claims.

According to certain embodiments of the present invention, a voice frame to be compressed is a voice frame that overlaps a measurement gap.

Further, according to certain embodiments of the present invention, transmission of a voice frame which does not overlap a measurement gap is performed according to a policy of an uncompressed mode.

Further, according to certain embodiments of the present invention, the fixed number of slots is 15 or 16.

Further, according to certain embodiments of the present invention, uplink transmission is performed in a dedicated physical control channel, and the uplink transmission is stopped after 10 ms.

Further, according to certain embodiments of the present invention, in downlink, a signal is set to interference ratio target boosting for increasing the downlink transmission power to compensate for the smaller number of transmitted slots.

Further, according to certain embodiments of the present invention, the downlink transmission is terminated prior to the set termination point when the voice frame is decoded correctly, whereby correct decoding may be indicated by a frame early termination acknowledgment message.

Further, according to certain embodiments of the present invention, when an uplink coverage limit is reached, the voice frame transmission spans over a 20 ms transmission duration.

Further, according to certain embodiments of the present invention, power control is performed using a signal to interference ratio offset on top of an internal signal to interference ratio target starting from the first slot of the voice frame that overlaps the measurement gap.

Further features and advantageous modifications are shown in the dependent claims.

BRIEF DESCRIPTION OF DRAWINGS

For a more complete understanding of example embodiments of the present invention, reference is now made to the following descriptions taken in connection with the accompanying drawings in which.

Figure 1A:
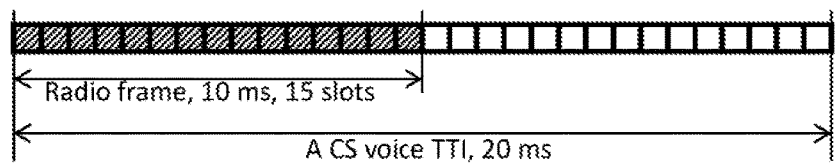
FIG. 1a schematically shows transmission of a voice frame on WCDMA in the case of a normal (i.e. uncompressed transmission) according to the prior art.
Figure 1B:
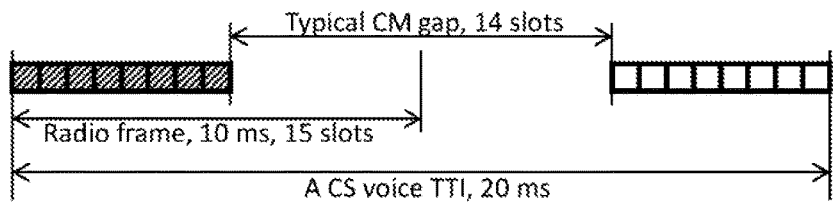
FIG. 1b schematically shows transmission of a voice frame on WCDMA in the case of a compressed mode transmission according to the prior art.
Figure 2:
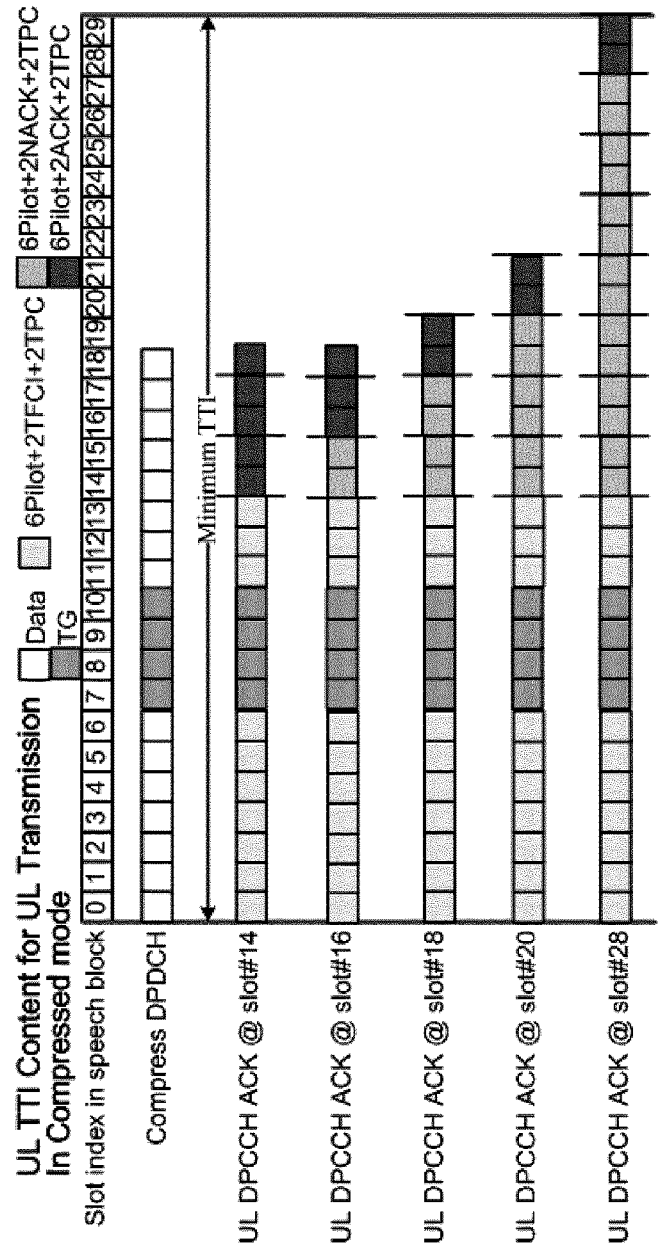
FIG. 2 illustrates a proposal for compressed mode CM with enhanced DCH according to the prior art.

DESCRIPTION OF EXEMPLARY
EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Some example versions of the disclosure and embodiments are described with reference to the drawings. In the following, different exemplifying examples will be described using, as an example of a communication network, a cellular wireless communication network, such as a WCDMA, an LTE or LTE-Advanced based system. However, it is to be noted that the present invention is not limited to an application using such types of communication system, but is also applicable in other types of communication systems, be it wireless systems, wired systems or systems using a combination thereof.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

In particular, the following example versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain features, structures, units, modules etc. that have not been specifically mentioned.

In general, a telecommunication network comprises plural network elements, such as NodeBs (base stations BS in WCDMA environment), evolved NodeBs (eNB; i.e. base station in LTE environment), user equipments UE (e.g. mobile phone, smart phone, Computer, etc.), controllers, interfaces, etc, and in particular any equipment used in the provision of a telecommunications service.

A basic system architecture of a communication system where example versions and embodiments are applicable may comprise a commonly known architecture of one or more communication networks comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell (macro cell, small cell) and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

Figure 3:
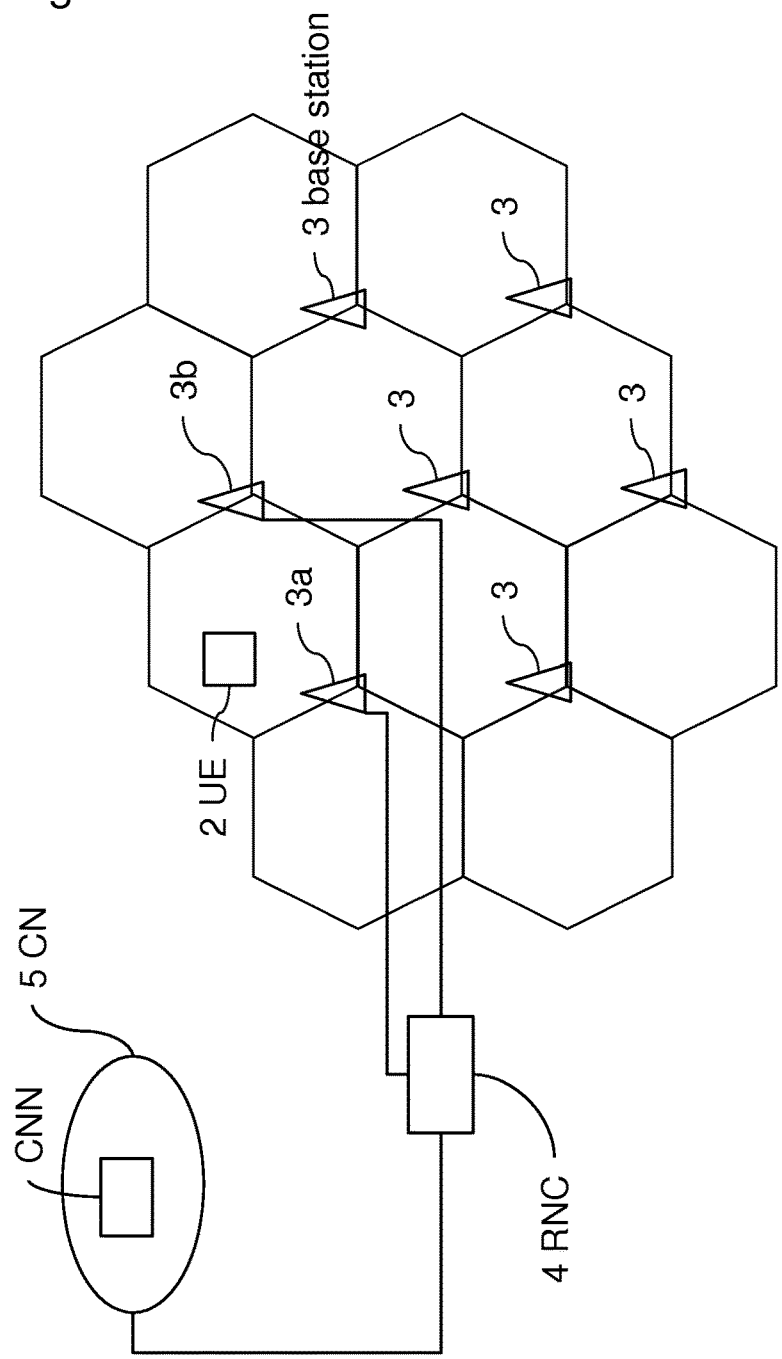
FIG. 3 schematically illustrates a general network architecture according to certain embodiments of the present invention.

FIG. 3 schematically illustrates a general network architecture according to certain embodiments of the present invention. Several base stations 3 form a plurality of cells via respective antennas (not shown) for achieving e.g. a cellular telecommunication network, in which one or a plurality of user equipments UE 2 may be served. Each of the base stations is connected and controlled by one or plural radio network controller RNC. As depicted in FIG. 3, the base stations 3a and 3b are connected to the RNC 4. The RNC 4 is coupled to a core network CN 5, which may comprise a core network node CNN.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a base station and a communication network besides those described in detail herein below.

According to certain embodiments of the present invention, the enhanced dedicated channel DCH design adopted a so-called 'FET (Frame Early Termination)-less' operation for uplink UL, where the voice frame is transmitted in 10 ms, and during the remainder only uplink control channel is transmitted until the downlink DL frame can be acknowledged. A main exception to this may be that if a user equipment UE is power limited (uplink coverage limit reached), then the voice frame transmission spans over the full 20 ms, reducing the required transmit power, but transmitting twice as long.

In downlink, a Node B transmits a voice frame until the UE indicates in UL by means of a FET-ACK that the frame was correctly received. At this point, the Node B stops transmitting, thus creating a gap. Thereby, according to certain embodiments of the present invention, it is possible to guarantee an (at least) 14-slot gap.

According to exemplary embodiments, in the case of a compressed mode, in uplink the voice frames that don't fall on a CM gap are transmitted normally, i.e. as if CM was not configured.

Further, during compressed mode according to certain embodiments, in uplink, the voice frames that are to be compressed are transmitted always in 10 ms, i.e. the fallback to 20 ms transmission is ignored even if the UE is power limited. Thereby, the uplink transmission may be always stopped at 10 ms point, i.e. the uplink data channel stops after the 10 ms, and the uplink control channel transmission is stopped at the same time too, and not continued to wait for the FET-ACK to be transmitted.

On the other hand, in the case of compressed mode according to certain embodiments, in downlink the voice frames that don't fall on a CM gap are transmitted normally, i.e. as if CM was not configured. Further, the DL transmission of a compressed voice frame is stopped after a fixed number of slots have been transmitted, e.g. after 16 slots, to ensure 14-slot gap, rather than waiting for the positive FET-ACK to be transmitted on the uplink control channel. Still further, the UE may use a SIR-target boosting to ensure that the power control requests a higher DL transmit power to compensate for the smaller number of transmitted slots.

Figure 4:
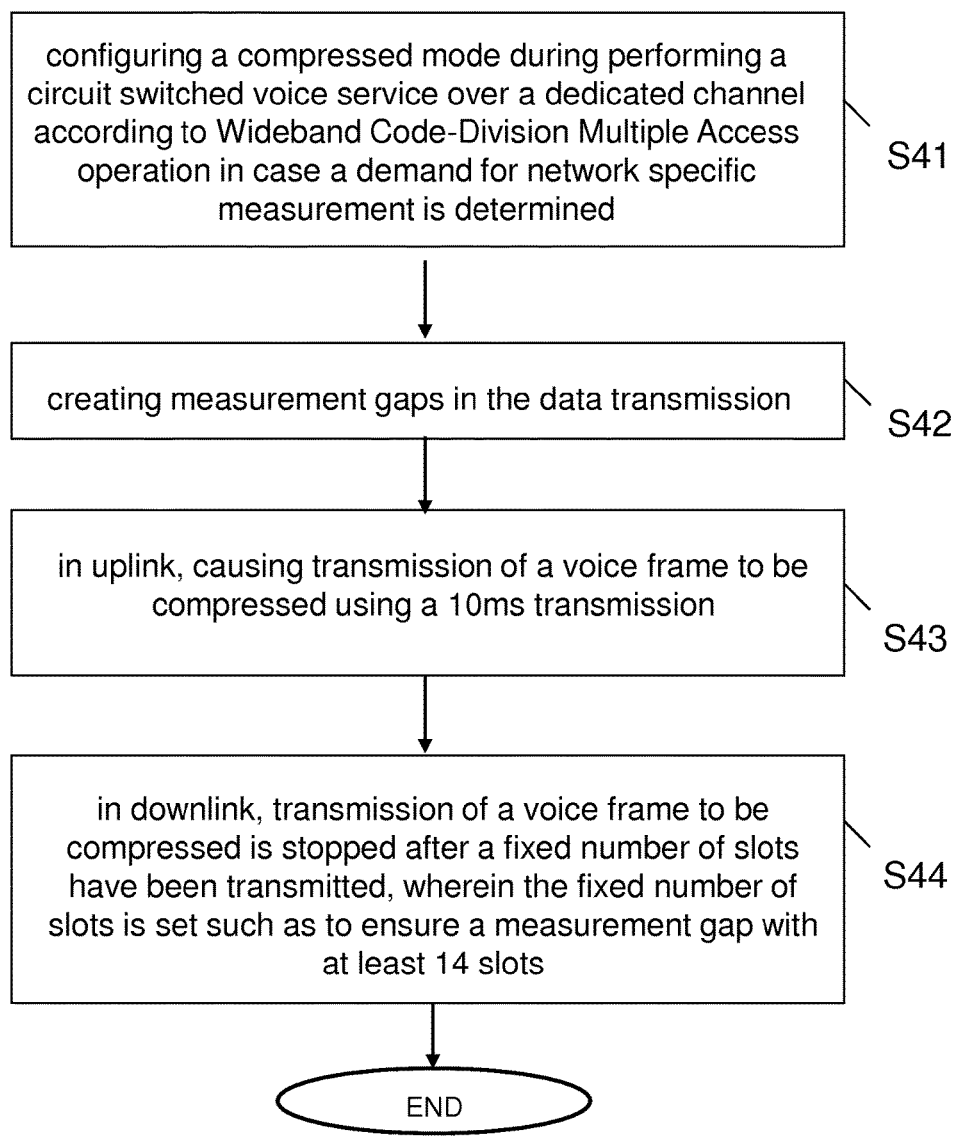
FIG. 4 schematically illustrates a method according to certain embodiments of the present invention.

FIG. 4 shows a method according to some example versions of the disclosure.

In Step S41, a compressed mode is configured during performing a circuit switched voice service over a dedicated channel according to Wideband Code-Division Multiple Access operation in case a demand for network specific measurement is determined.

Further, in Step S42, measurement gaps are created in the data transmission.

Still further, in Step S43, in uplink, transmission of a voice frame to be compressed using a 10 ms transmission is caused.

Moreover, in Step S44, in downlink, transmission of a voice frame to be compressed is stopped after a fixed number of slots have been transmitted, wherein the fixed number of slots is set such as to ensure a measurement gap with at least 14 slots.

Figure 5:
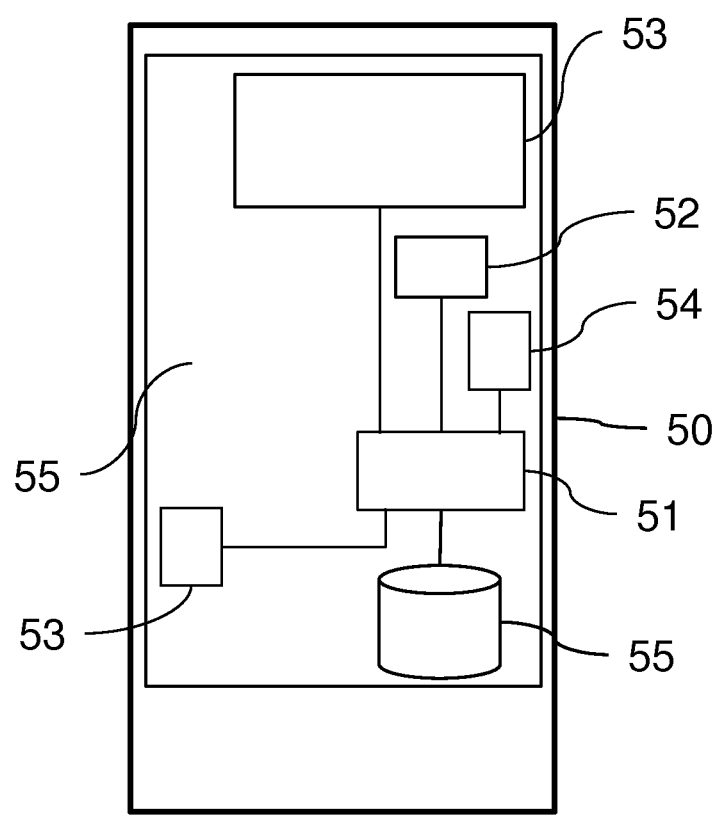
FIG. 5 schematically shows an apparatus, such as a user equipment, according to certain embodiments of the invention.

In FIG. 5, a diagram illustrating a configuration of a network element 50, such as a user equipment of a communication network according to some example versions of the disclosure is shown. It is to be noted that the network element may comprise elements or functions, such as a chipset, a chip, a module etc., which can also be part of a network element or attached as a separate element to a network element, or the like. It should be understood that each block and any combination thereof may be implemented by various means or their combinations, such as hardware, software, firmware, one or more processors and/or circuitry.

The network element 50 shown in FIG. 5 may comprise a processing function, control unit or processor 51, such as a CPU or the like, which is suitable for executing instructions given by programs or the like related to the network element control procedure, and which is suitable for controlling the agent or an application serving as the agent.

The processor 51 is configured to execute processing related to the above described processing. In particular, the processor 51 comprises a sub-portion as a configuration unit adapted to configure a compressed mode during performing a circuit switched voice service over a dedicated channel according to Wideband Code-Division Multiple Access operation in case a demand for network specific measurement is determined. The portion may be configured to perform processing according to S41 of FIG. 4. Furthermore, the processor 51 comprises a sub-portion usable as a creation unit configured to create measurement gaps in the data transmission. The portion may be configured to perform processing according to S42 of FIG. 4. Furthermore, the processor 51 comprises a sub-portion usable as an transmission/reception unit configured to in uplink, causing transmission of a voice frame to be compressed using a 10 ms transmission. The portion may be configured to perform a processing according to S43 of FIG. 4.

Further, the network element, such as an user equipment, may comprise as a non-limiting examples, user input interface, e.g. keys, touch field 52, a user output interface, e.g. display, speaker 53, a RF interface 53, and other components 54, which may be disposes on one or plural circuit boards 55. Reference sign 56 denotes a memory usable, for example, for storing data and programs to be executed by the processor 51 and/or as a working storage of the processor 51.

Figure 6:
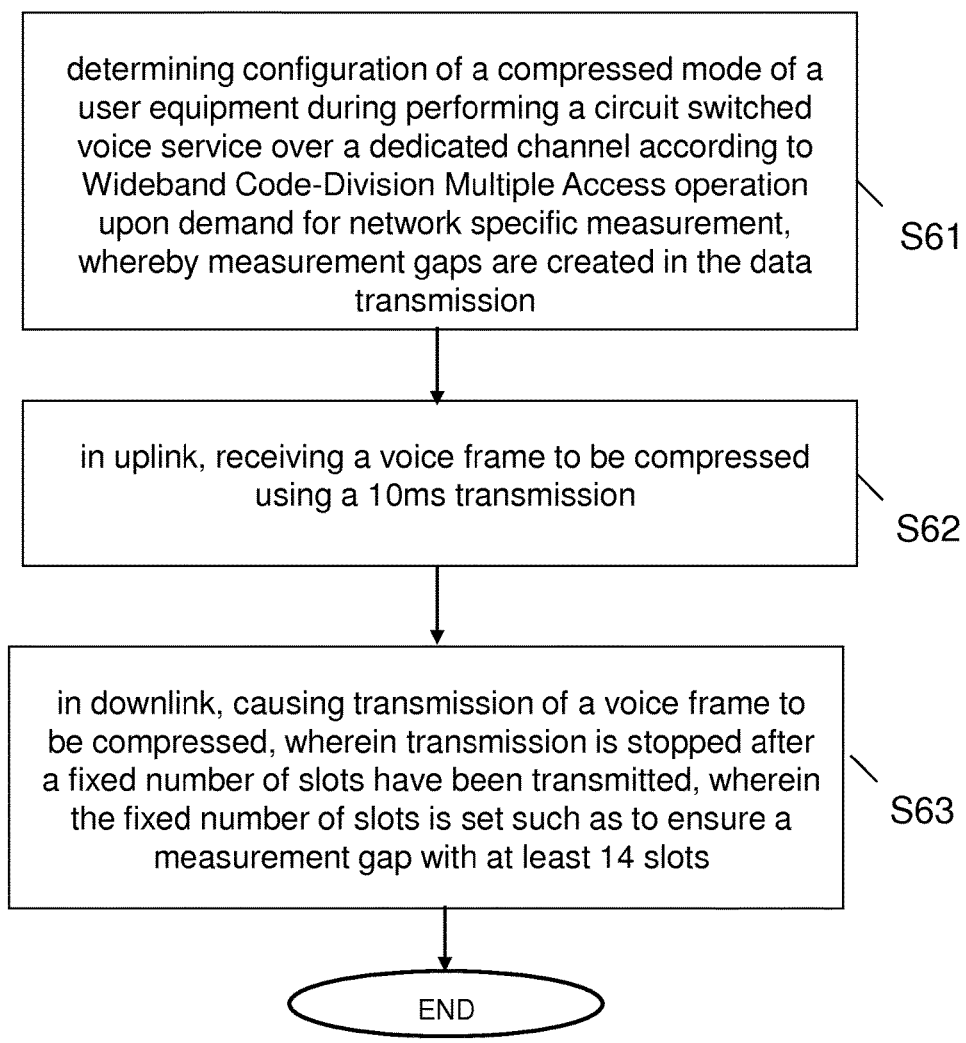
FIG. 6 schematically illustrates a method according to certain embodiments of the present invention.

FIG. 6 shows a method according to some example versions of the disclosure.

In Step S61, configuration of a compressed mode of a user equipment during performing a circuit switched voice service over a dedicated channel according to Wideband Code-Division Multiple Access operation upon demand for network specific measurement is determined, whereby measurement gaps are created in the data transmission.

Further, in Step S62, in uplink, a voice frame to be compressed using a 10 ms transmission is received.

Still further, in Step S63, in downlink, transmission of a voice frame to be compressed is caused, wherein transmission is stopped after a fixed number of slots have been transmitted, wherein the fixed number of slots is set such as to ensure a measurement gap with at least 14 slots.

Figure 7:
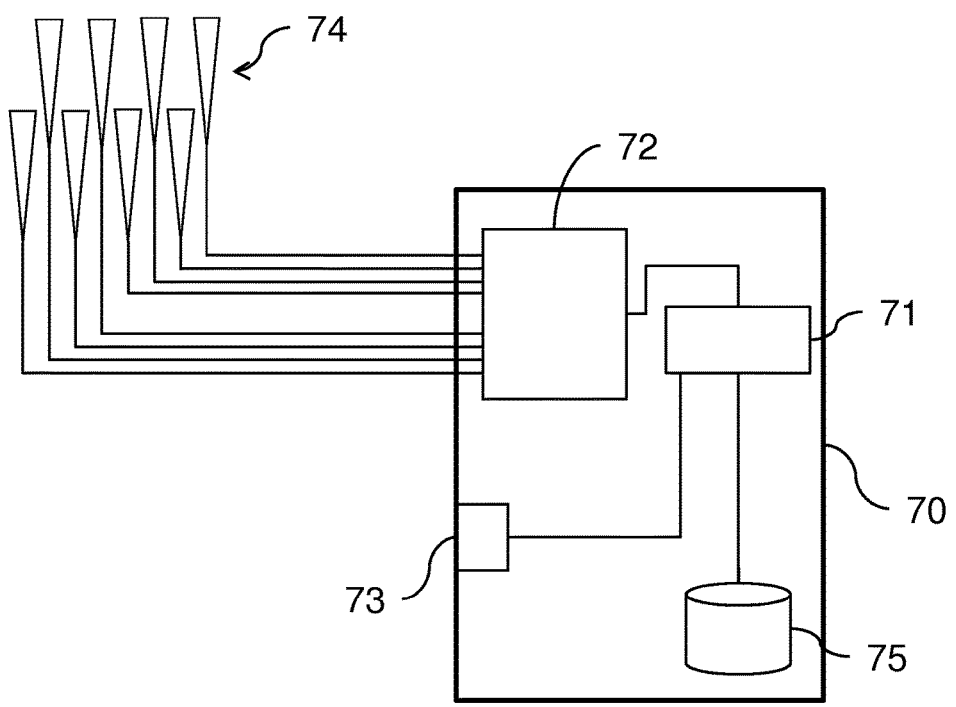
FIG. 7 schematically illustrates an apparatus, such as a base station, according to certain embodiments of the invention.

In FIG. 7, a diagram illustrating a configuration of a network element of a communication network according to some example versions of the disclosure is shown, which is embodied by a base station. The network element 71 may comprise elements or functions, such as a chipset, a chip, a module etc., wherein each block and any combination thereof may be implemented by various means or their combinations, such as hardware, software, firmware, one or more processors and/or circuitry.

The network element 71 shown in FIG. 7 may comprise a processing function, control unit or processor 71, such as a CPU or the like, which is suitable for executing instructions given by programs or the like related to the network element control procedure, and which is suitable for controlling the agent or an application serving as the agent.

The processor 71 is configured to execute processing related to the above described processing. In particular, the processor 71 comprises a sub-portion as a determination unit adapted to determine configuration of a compressed mode of a user equipment during performing a circuit switched voice service over a dedicated channel according to Wideband Code-Division Multiple Access operation upon demand for network specific measurement, whereby measurement gaps are created in the data transmission. The portion may be configured to perform processing according to S61 of FIG. 6. Furthermore, the processor 71 comprises a sub-portion usable as a reception unit configured to, in uplink, receive a voice frame to be compressed using a 10 ms transmission. The portion may be configured to perform processing according to S62 of FIG. 6. Furthermore, the processor 71 comprises a sub-portion usable as an transmission unit configured to, in downlink, causing transmission of a voice frame to be compressed, wherein transmission is stopped after a fixed number of slots have been transmitted, wherein the fixed number of slots is set such as to ensure a measurement gap with at least 14 slots. The portion may be configured to perform a processing according to S63 of FIG. 6.

Further, the network element, such as a base station, may comprise as a non-limiting examples, a RF interface circuitry 72, a an interface 73, a RF interface 53, and an antenna array 74. Reference sign 75 denotes a memory usable, for example, for storing data and programs to be executed by the processor 71 and/or as a working storage of the processor 71.

Figure 8:
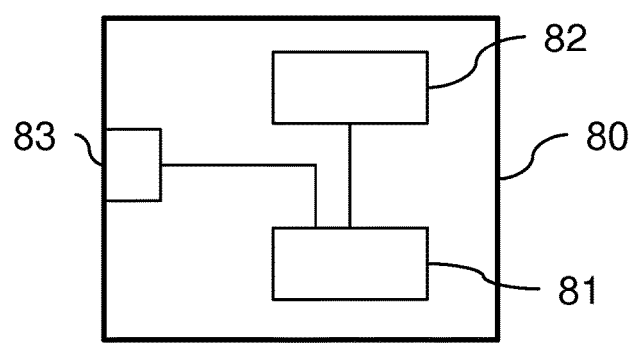
FIG. 8 schematically illustrates an apparatus, such as a network node/control node according to certain embodiments of the invention.

FIG. 8 schematically shows components of a network node 80, which may be configured according to certain embodiments of the present invention. The network node may comprise a processor 81 configured to perform any of the steps of FIG. 4 or FIG. 6, a memory 82 usable, for example, for storing data and programs to be executed by the processor 81 and/or as a working storage of the processor 81, and an interface 83 for transmitting receiving information.

In general, as already indicated above, a transmission gap is required by an UE to perform measurements on other frequencies. Further, the known compressed mode CM operation guarantees a transmission gap within a TTI (of 20 ms) for DCH. However, the known uplink control channel structure selected for the enhanced DCH channel for voice is not compatible with the current CM operation, since the UL control channel structure requires 10 transmission slots for TFCI information, but current CM operations merely provide 8 transmission slots.

Further, voice frames are transmitted continuously in 20 ms TTI. Therefore, for measurements performed by an UE, compressed mode allows transmission and reception gaps. In particular, a typical CM parameterization for CS voice link is a 14-slot gap that spans over two radio frames and repeats once every 40 ms. Still further, in general the aim of a downlink power control in uplink or/and downlink compressed mode is to recover as fast as possible a signal-to-interference ratio (SIR) close to the target SIR after each transmission gap.

Figure 9:
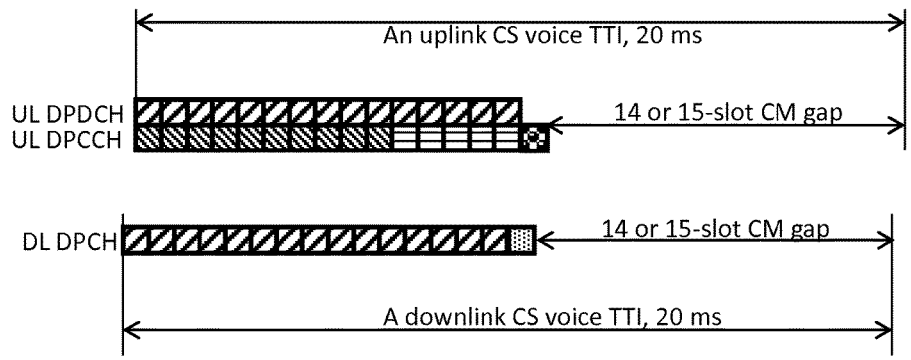
FIG. 9 shows a compressed mode gap with enhanced dedicated channel.

FIG. 9 illustrates a compressed mode gap with enhanced dedicated channel, and in particular a fixed compressed mode gap generation with enhanced DCH, showing a 14 or 15-slot CM gap created in the downlink CS voice TTI of 20 ms. Thereby, the $16^{th}$ slot of uplink DPCCH may or may not be transmitted. This additional slot may be somewhat beneficial for power control and channel estimation purposes, but the transmission of this slot is not necessary when the UL DPDCH (voice frame) is sent in 15 slots, and the power control of the $16^{th}$ DL slot is delivered in the 15th slot of the UL DPCCH.

In the following, an uplink transmission procedure and a downlink transmission procedure of the invention according to certain embodiments of the invention are described.

In the uplink transmission according certain embodiments, when a UE is in the compressed mode, the 20 ms voice TTI that overlaps with the compressed mode gap uses always 10 ms transmission, and it will also stop the uplink control channel (DPCCH) transmission after 10 ms.

Further, in the downlink transmission procedure according to certain embodiments, when the UE is in compressed mode, the 20 ms voice TTI that overlaps with the compressed mode gap transmits a fixed number of slots (e.g. 15 or 16) and the transmission stops at the fixed point. Thereby, it would be possible to use FET to terminate the DL transmission also prior to the set termination point if the UE is already able to decode the voice frame correctly, but even if FET-ACK has not been received when reaching the set transmission termination point, the transmission is anyway terminated.

The currently specified behavior of power control PC is as follows. According to the basic power control, the normal power control procedure is divided in two loops, inner-loop and outer-loop power control. The outer-loop PC is driven by some quality metric, such as frame erasure rate, block error rate or bit error rate of the received signal. That loop adjusts the SIR target for the inner-loop PC, if the quality metric does not meet the set quality target, then the SIR target is increased, and if the quality metric exceeds the set quality target then the SIR target is reduced. The inner loop PC will then try and maintain the received DPCCH's SIR at the SIR target by sending power control commands back to the transmitter. The same method is used for both uplink and downlink power control for DCH and enhanced DCH.

Figure 10:
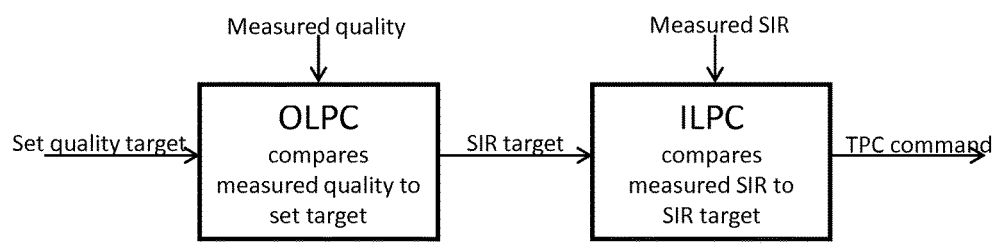
FIG. 10 illustrates a block diagram of power control according to certain embodiments of the present invention.

FIG. 10 illustrates a block diagram of power control. A quality target set in the outer loop PC is compared with a measured quality, and the SIR target is forwarded to the inner loop PC, wherein the SIR target is compared with a measured SIR. Then, a TPC command is output from the inner loop PC.

According to the current power control in compressed mode, the instantaneous data rate is increased to be able to send the same amount of data with a smaller number of transmitted slots, and a number of SIR target offsets are applied using the Inner Loop Power Control ILPC function. These offsets are used to compensate for the break in the power control loop, change in data rate and change in the number of pilot bits received in a frame. The values for the parameters are set by the network.

However, according to the uplink power control in compressed mode according to certain embodiments of the present invention, the uplink power control in the TTIs which overlap the compressed mode gap do not differ from the uplink power control during the normal operation of enhanced DCH. This is due to the fact that in normal operation, the voice frames are also transmitted in 10 ms, and the DPCCH transmission duration varies between 15 and 30 slots. To compensate for the longer CM gap, the Node B may apply a SIR offset either prior or after the CM gap, or both. If a FET operation is introduced in uplink, then a SIR target offset and UE step in the transmission power (either a higher gain factor for the DPDCH, or an increased DPCCH transmission power relative to which the DPDCH power is set) may be needed as in the downlink.

Further, according to downlink power control in compressed mode according to certain embodiments of the present invention, one single offset to the Inner Loop Power Control ILPC function operating in the UE is provided by the network. The UE may use this SIR-offset on top of the internal SIR-target starting from the first slot of the radio frame of the voice TTI that overlaps the compressed mode gap. Further, at that same point in time the Node B may adjust the transmission power of the enhanced DCH code channel to proactive get the channel power more close to the boosted SIR target.

Figure 11:
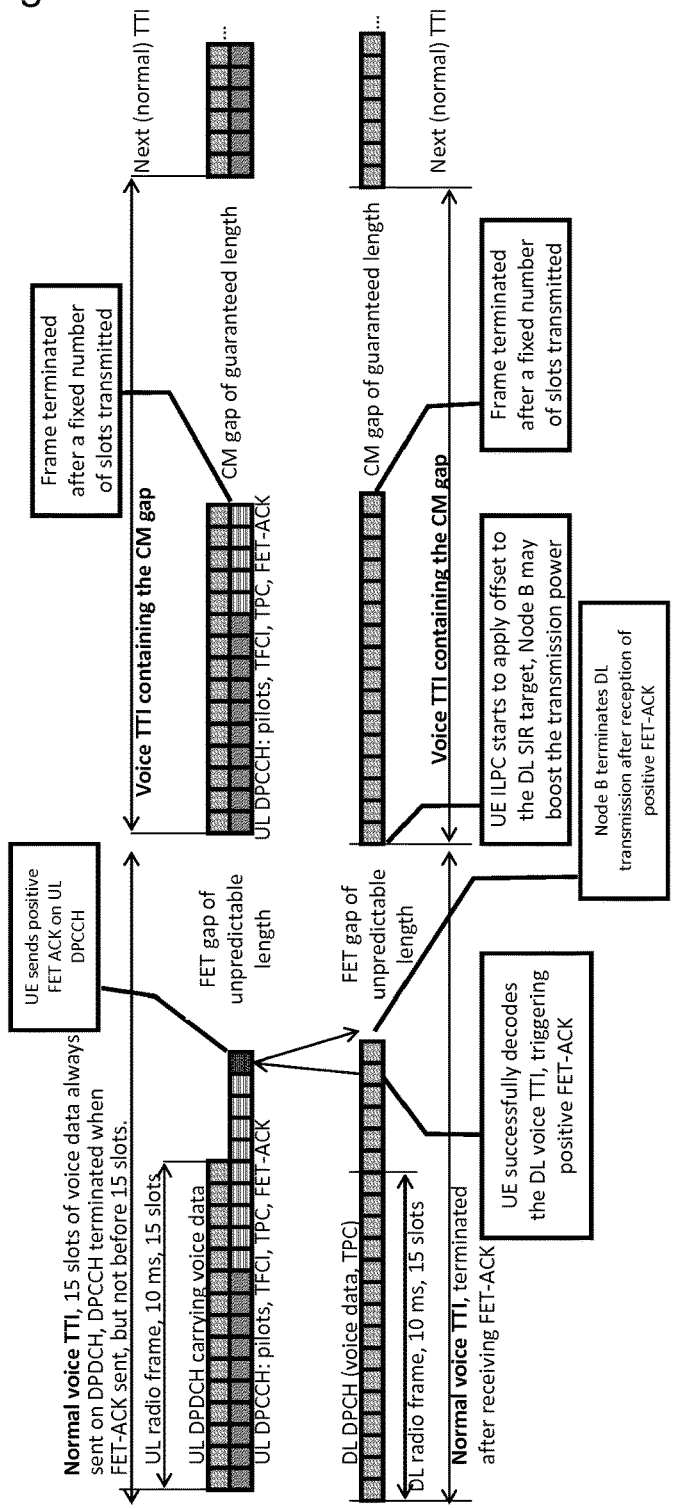
FIG. 11 illustrates uplink and downlink CM operation according to certain embodiment of the invention.

FIG. 11 illustrates an uplink and downlink CM operation according to exemplary embodiments of the invention, wherein the uplink is in the normal (not power limited) transmission mode. In UL the voice frame is always sent in 10 ms of 15 slots, and it is transmitted on the UL Dedicated Physical Data Channel DPDCH. In DL, the voice frame has a 20 ms TTI duration and is transmitted on the DL Dedicated Physical Channel DPCH. The UE can stop transmitting in total when it no longer needs to send UL DPDCH (after 10 ms) nor UL DPCCH (when positive FET-ACK is sent). The UE can stop receiving when the DL voice frame decodes correctly (after enough energy collected for the voice frame for the CRC check to pass).

Figure 12:
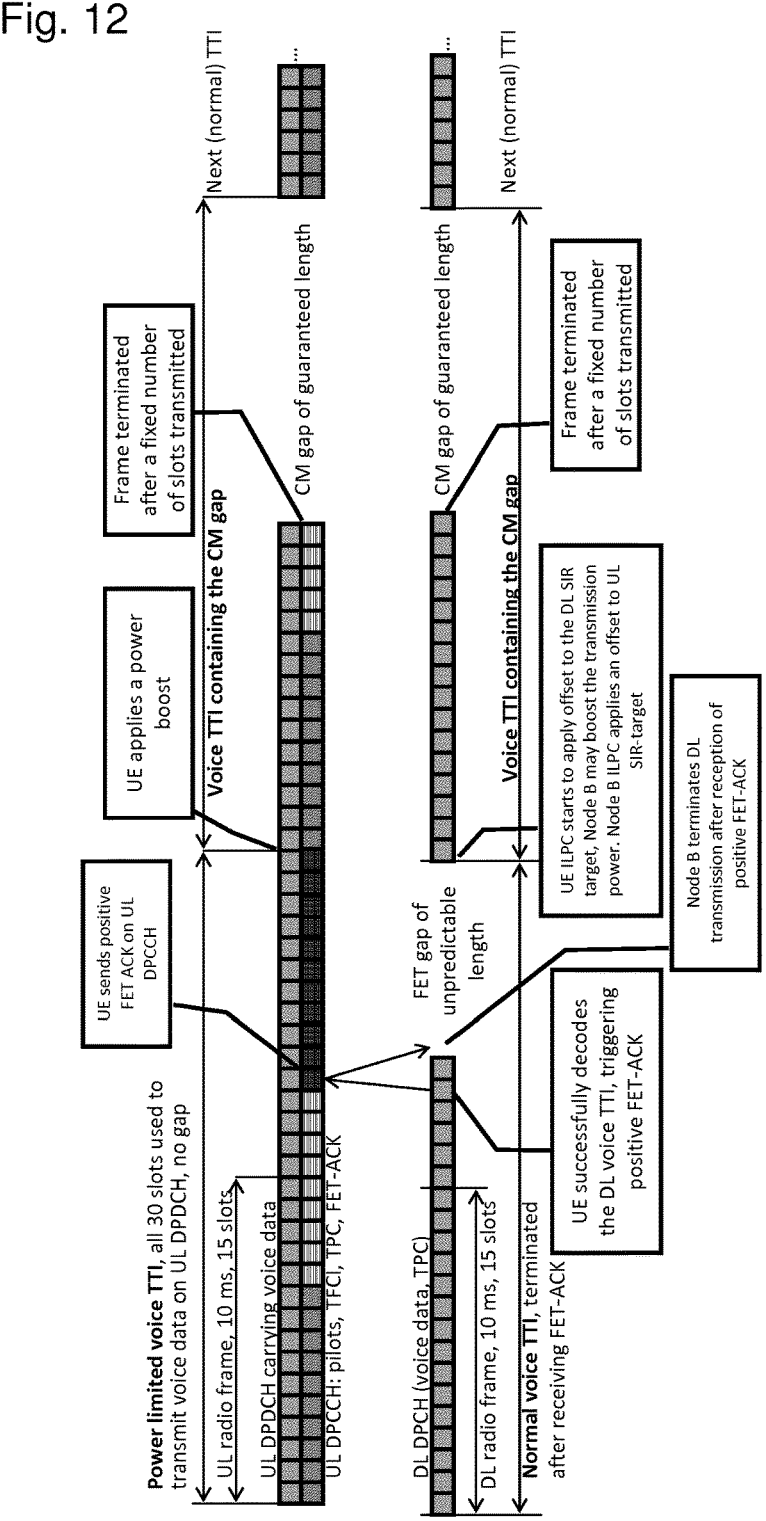
FIG. 12 illustrates uplink and downlink CM operation according to further embodiments of the invention.

FIG. 12 illustrates uplink and downlink CM operation according to exemplary embodiments of the invention, wherein the uplink is in the power limited transmission mode. The UL voice frame has a length of 20 ms TTI, and all 20 ms, thirty slots are always sent. The DL operation is as in FIG. 11.

Thus, according to certain embodiments of the present invention, the DCH transmission gaps are provided during enhanced DCH operation. Further, the transmission will always stop at a fixed point in time without waiting for the receiver to send indication of correct or wrong reception. In order to increase the probability of correct reception in CM, the enhanced DCH transmission is power boosted for first pre-defined slots (eg., 15) and stopped after first pre-defined slots (eg., 15 slots) even if transmission has not been acknowledged or completely transmitted which is contrary to normal transmission concept.

Still further, according to certain embodiments, the UL transmission is not power limited. That is, in UL and DL CM operation, transmission in a transmission time interval TTI will stop after pre-defined number of slots, and the UE performs a power boost in UL transmission. An UL voice frame is transmitted in first 15 slots at 10 ms of TTI on DPDCH (for enhanced DCH for CS voice service), which ensures a guaranteed transmission gap of a defined length of 15 slots remaining TTI, whereas a DL voice frame is transmitted on all 30 slots at 20 ms of TTI on DL DPCH.

Then, according to certain embodiments, the UL transmission is power limited. That is, in the UL and DL CM operation, the UL voice frame not containing the CM gap is always in all 30 slots of 20 ms of TTI on UL DPDCH, wherein power is not increased if power limit has been reached, but the UL voice frame containing the CM gap is still transmitted in only 15 slots and 10 ms and a gap is generated at the expense of increased likelihood for the voice frame not to decode correctly due to insufficient transmit power available.

Additionally, transmission in a transmission time interval TTI will stop after pre-defined number of slots, thus the UE does not perform power boost in UL transmission (power limit reached). An UL voice frame is transmitted in first 15 slots of 10 ms of TTI on DPDCH (for enhanced DCH for CS voice service), which ensures a guaranteed transmission gap of a defined length of 15 slots of remaining TTI. In DL there is no need for similar power limit behavior as the Node B transmitter is much more powerful than the UE transmitter, and the radio connection coverage is typically constrained by the uplink coverage. Still, the DL transmit power needs to be boosted in the TTIs with the CM gap to guarantee desired decoding success rate after the fixed number of slots (e.g. 15 or 16) is transmitted.

According to certain embodiments, power boost may be defined as fixed predefined value, e.g. 3 db in specification or configurable via Radio Resource Control RRC, for example as a new IE (ie., a single offset to the Inter-Loop Power control ILPC function operating in UE), indicating the UE power boost level exchanged between UE and base station.

Generally, the present invention may be embodied e.g. in a mobile device, a base station, a system, a transmission and reception apparatus (modem chipset), or the like. It is to be noted that this listing of possible embodiments is not limiting, and it is apparent to one skilled in the art that several other embodiments may be applied without departing from the scope of the present invention.

To summarize, a CM operation according to certain embodiments provide a 14 slots transmission gap to UE during enhanced DCH operation for CS voice service, which provides necessary transmission gaps for measuring neighboring cells operating on other frequencies.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under WCDMA, LTE™ or LTE-Advanced, and can advantageously be implemented also in controllers, base stations, user equipments or smart phones connectable to such networks. That is, it can be implemented e.g. as/in chipsets to connected devices.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The communication network is also able to communicate with other networks, such as a public switched telephone network or the Internet. The communication network may also be able to support the usage of cloud services. It should be appreciated that BSs and/or NBs or their functionalities may be implemented by using any node, host, server or access node etc. entity suitable for such a usage.

Furthermore, the described network elements, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

The following meanings for the abbreviations used in this specification apply:
3GPP 3rd Generation Partnership Project
ACK acknowledgement
CCTrCh Coded composite Transport Channel
CM Compressed mode
CS Circuit Switched
DCH Dedicated Channel
CPICH Common Pilot Channel
DPCCH Dedicated Physical Control Channel
DPCH Dedicated Physical Channel
DPDCH Dedicated Physical Data Channel
dB Decibel
DL Downlink
eNodeB (eNB) LTE base station in 3GPP terminology
FET Frame Early Termination
GSM Global System for Mobile Communications
ILPC Inner Loop Power Control
LTE Long Term Evolution
ms Milliseconds
NACK negative acknowledgement
Node B (NB) WCDMA base station in 3GPP terminology
OLPC Outer Loop Power Control
PC Power Control
QPSK Quadrature Phase Shift Keying
TrCh Transport Channel
TS Technical Specification
SCH Synchronization Channel
SIR Signal to Interference Ratio
TFCI Transport Format Combination Indication
TGL Transmission Gap Length
TPC Transmit Power Control Command
TTI Transmission Time Interval
UE User Equipment
UL uplink
UMTS Universal Mobile Telecommunications System
UTRA UMTS Terrestrial Radio Access
UTRAN UMTS Terrestrial Radio Access Network
WCDMA Wideband Code-Division Multiple Access

What is claimed:

1. An apparatus, comprising:
   at least one processor; and
   at least one memory including computer program code,
   the at least one memory and the computer program code configured to, with the at least one processor, cause the apparatus at least to:
   configure a compressed mode during performing of a circuit switched voice service over a dedicated channel according to Wideband Code-Division Multiple Access operation in case a demand for network specific measurement is determined;
   create measurement gaps in the data transmission;
   in uplink, cause transmission of a voice frame to be compressed using a 10 ms transmission; and
   in downlink, transmission of a voice frame to be compressed is stopped after a fixed number of slots have been transmitted, wherein the fixed number of slots results in a measurement gap with at least 14 slots.

2. The apparatus according to claim 1, wherein a voice frame to be compressed is a voice frame that overlaps a measurement gap.

3. The apparatus according to claim 2, wherein power control is performed using a signal to interference ratio offset on top of an internal signal to interference ratio target starting from the first slot of the voice frame that overlaps the measurement gap.

4. The apparatus according to claim 1, wherein transmission of a voice frame which does not overlap a measurement gap is performed according to a policy of an uncompressed mode.

5. The apparatus according to claim 1, wherein the fixed number of slots is 15 or 16.

6. The apparatus according to claim 1, wherein uplink transmission is performed in a dedicated physical control channel, and the uplink transmission is stopped after 10 ms.

7. The apparatus according to claim 1, wherein in downlink, further comprising setting a signal to interference ratio target boosting for increasing the downlink transmission power to compensate for the smaller number of transmitted slots.

8. The apparatus according to claim 1, wherein the downlink transmission is terminated prior to the set termination point when the voice frame is decoded correctly.

9. The apparatus according to claim 8, wherein correct decoding is indicated by a frame early termination acknowledgment message.

10. The apparatus according to claim 1, wherein, when an uplink coverage limit is reached, the voice frame transmission spans over a 20 ms transmission duration.

11. An apparatus, comprising:
    at least one processor; and
    at least one memory including computer program code,
    the at least one memory and the computer program code configured to, with the at least one processor, cause the apparatus at least to:
    determine configuration of a compressed mode of a user equipment during performing a circuit switched voice service over a dedicated channel according to Wideband Code-Division Multiple Access operation upon demand for network specific measurement, whereby measurement gaps are created in the data transmission;
    in uplink, receive a voice frame to be compressed using a 10 ms transmission; and
    in downlink, cause transmission of a voice frame to be compressed, wherein transmission is stopped after a fixed number of slots have been transmitted, wherein the fixed number of slots results in a measurement gap with at least 14 slots.

12. The apparatus according to claim 11, wherein a voice frame to be compressed is a voice frame that overlaps a measurement gap.

13. The apparatus according to claim 11, wherein transmission of a voice frame which does not overlap a measurement gap is performed according to a policy of an uncompressed mode.

14. The apparatus according to claim 11, wherein the fixed number of slots is 15 or 16.

15. The apparatus according to claim 11, wherein uplink acknowledgement for the DL voice frame reception is performed in a dedicated physical control channel, and the uplink transmission is stopped after 10 ms even if the DL voice frame was not yet positively acknowledged.

16. The apparatus according to claim 11, further comprising adjusting the transmission power of the dedicated channel to get the channel power more close to a signal to a boosted interference ratio target, which has been boosted for increasing the downlink transmission power to compensate for the smaller number of transmitted slots.

17. The apparatus according to claim 11, wherein the voice frame is transmitted until the user equipment indicates in the uplink that the voice frame is correctly received.

18. The apparatus according to claim 17, wherein correct reception is determined upon reception of a frame early termination acknowledgment message.

19. A computer program product, embodied as a non-transitory computer-readable medium or directly loadable into a computer, comprising a set of instructions which, when executed on an apparatus, is configured to cause the apparatus to at least:

determine configuration of a compressed mode of a user equipment during performing a circuit switched voice service over a dedicated channel according to Wideband Code-Division Multiple Access operation upon demand for network specific measurement, whereby measurement gaps are created in the data transmission;

in uplink, receive a voice frame to be compressed using a 10 ms transmission; and in downlink, cause transmission of a voice frame to be compressed, wherein transmission is stopped after a fixed number of slots have been transmitted, wherein the fixed number of slots results in a measurement gap with at least 14 slots.

* * * * *